United States Patent
Kubo et al.

(10) Patent No.: US 6,952,007 B2
(45) Date of Patent: Oct. 4, 2005

(54) METHOD FOR ESTIMATING AMOUNT OF ANGULAR DISAGREEMENT OF PLANES OF POLARIZATION OF POLARIZATION-MAINTAINING OPTICAL FIBERS AND FOR CONNECTING POLARIZATION-MAINTAINING OPTICAL FIBERS

(75) Inventors: Toshiki Kubo, Sakura (JP); Shigeru Saito, Sakura (JP); Noriyuki Kawanishi, Sakura (JP)

(73) Assignee: Fujikura, Ltd., Tokyo (JP)

( * ) Notice: Subject to any disclaimer, the term of this patent is extended or adjusted under 35 U.S.C. 154(b) by 0 days.

(21) Appl. No.: 10/090,929

(22) Filed: Mar. 4, 2002

(65) Prior Publication Data

US 2002/0166953 A1 Nov. 14, 2002

(30) Foreign Application Priority Data

May 10, 2001 (JP) .................................... P2001-140032

(51) Int. Cl.⁷ ................................................ G02F 1/01
(52) U.S. Cl. ...................................... 250/225; 385/98
(58) Field of Search ............................ 250/225, 227.17, 250/227.24, 227.28, 227.3, 227.29; 385/95–98, 11; 356/73.1, 364

(56) References Cited

U.S. PATENT DOCUMENTS

| | | | | |
|---|---|---|---|---|
| 5,488,683 A | * | 1/1996 | Michal et al. | |
| 5,611,015 A | * | 3/1997 | Tokumaru et al. | |
| 5,677,973 A | * | 10/1997 | Yuhara et al. | ........ 385/90 |
| 5,758,000 A | * | 5/1998 | Zheng | |
| 5,881,185 A | * | 3/1999 | Feth et al. | |

FOREIGN PATENT DOCUMENTS

| | | |
|---|---|---|
| JP | 1-147506 | 6/1989 |
| JP | 1-225906 | 9/1989 |
| JP | 2-58704 | 4/1990 |
| JP | 02-196204 | 8/1990 |
| JP | 2-287504 | 11/1990 |
| JP | 5-341148 | 12/1993 |
| JP | 8-15562 | 1/1996 |
| JP | 8-15563 | 1/1996 |
| JP | 08-114720 | 5/1996 |
| JP | 8-506432 | 7/1996 |

* cited by examiner

Primary Examiner—Thanh X. Luu
(74) Attorney, Agent, or Firm—Bell, Boyd & Lloyd LLC

(57) ABSTRACT

The present invention is provided for accurately estimating an amount of angular disagreement of planes of polarization between two polarization-maintaining optical fibers when connecting the polarization-maintaining optical fibers. In the present invention, a distribution of the polarization-maintaining optical fibers by irradiating a light on the lateral side of the polarization-maintaining optical fibers. The positions and heights of peaks of brightness of a transmitted light produced by the irradiated light are varied to comply with the angular disagreement of an axis of polarization which traverses two stress applying sections toward the irradiation direction of the light of each polarization-maintaining optical fiber. The amount of angular disagreement of the planes of polarization can be accurately estimated from the positions and heights of the peaks.

4 Claims, 3 Drawing Sheets

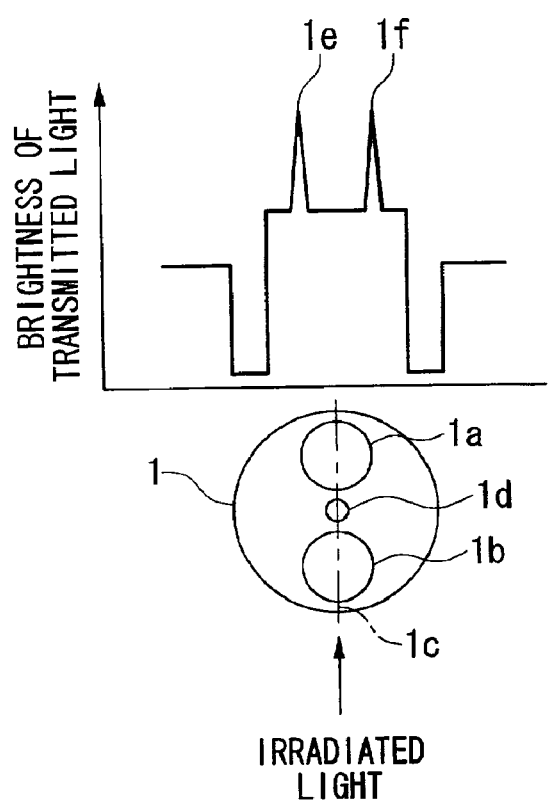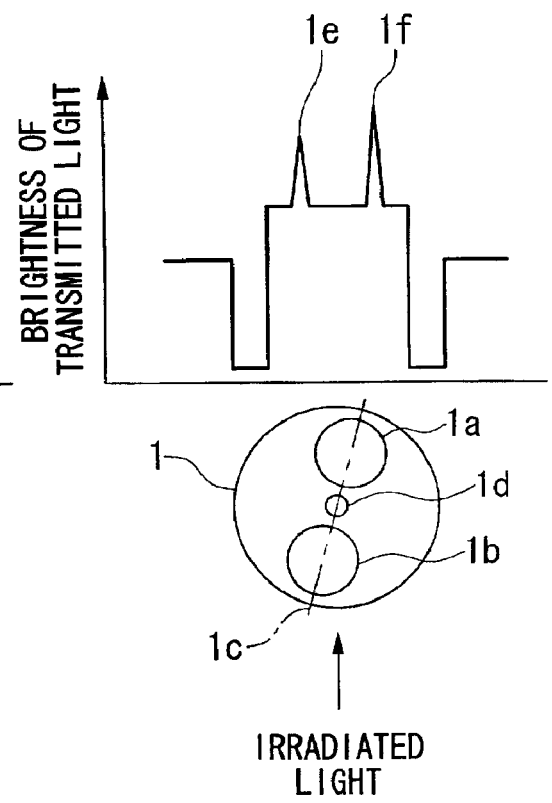

IRRADIATED LIGHT

METHOD FOR ESTIMATING AMOUNT OF ANGULAR DISAGREEMENT OF PLANES OF POLARIZATION OF POLARIZATION-MAINTAINING OPTICAL FIBERS AND FOR CONNECTING POLARIZATION-MAINTAINING OPTICAL FIBERS

BACKGROUND OF THE INVENTION

1. Field of the Invention

The present invention relates to a method for estimating an amount of angular disagreement of planes of polarization between two polarization-maintaining optical fibers when connecting the polarization-maintaining optical fibers and relates to a method for connecting two polarization-maintaining optical fibers while controlling the angular disagreement using this method for estimating the amount of angular disagreement.

2. Description of the Related Art

Conventionally, there are two methods for measuring an amount of angular disagreement of planes of polarization between two polarization-maintaining optical fibers when connecting the polarization-maintaining optical fibers.

In the first method, polarized light which is emitted from a polarizer is passed through the polarization-maintaining optical fibers to be connected and received by an analyzer, and the amount of angular disagreement of the planes of polarization between the polarization-maintaining optical fibers is measured from the angular variation of the light which was received by an analyzer.

In the second method, the polarization-maintaining optical fibers is irradiated by light from the lateral side thereof, and the amount of angular disagreement of the planes of polarization between two polarization-maintaining optical fibers is measured by comparing images produced by the light which has been transmitted through the polarization-maintaining optical fibers. This method using a technique for adjusting axes of polarization of two polarization-maintaining optical fibers which are to be connected by an image processing and is used in an optical fiber fusion splicer, and a method for measuring the amount of angular disagreement of planes of polarization between two polarization-maintaining optical fibers using this technique is disclosed in Japanese Unexamined Patent Application, First Publication No. 8-114720.

However, in a method in which the polarizer and analyzer are used and the amount of angular disagreement of the planes of polarization between the polarization-maintaining optical fibers is measured by passing the light through the optical fibers, the set up of the polarizer and analyzer takes time, and as a result, it takes a lot of time to measure the amount of angular disagreement of the planes of polarization. In addition, after the installation of the connected polarization-maintaining optical fibers in a device and the like, there are cases in which the light cannot be passed through the polarization-maintaining optical fibers, and as a result, the amount of angular disagreement of the planes of polarization cannot be measured.

Furthermore, in a method in which irradiating the light on the polarization-maintaining optical fibers from the lateral side and measuring the amount of angular disagreement of the planes of polarization between the polarization-maintaining optical fibers from the images of the transmitted light, angles of the planes of polarization between two polarization-maintaining optical fibers can be adjusted; however, it is not easy to determine the amount of angular disagreement of the planes of polarization. In addition, in the method disclosed in Japanese Unexamined Patent Application, First Publication No. 8-114720, the amount of angular disagreement of the planes of polarization is measured by comparing numerical values obtained from a position of each peak of the transmitted light; however, the relationship between the position of the peak and the amount of angular disagreement of the planes of polarization varies in accordance with the characteristics of the polarization-maintaining optical fibers, especially with the shape, material, and refractive index of stress applying sections provided therein, and therefore, the amount of angular disagreement of the planes of polarization cannot be accurately measured from the position of the peak.

SUMMARY OF THE INVENTION

The present invention is performed in view of the above circumstances, and objects of the present invention are to provide a method for accurately estimating an amount of angular disagreement of planes of polarization between two polarization-maintaining optical fibers during or after the connection of the polarization-maintaining optical fibers, and to provide a method for connecting two polarization-maintaining optical fibers without angular disagreement.

In order to achieve the above objects, the present invention provides a method for estimating an amount of angular disagreement of planes of polarization between two polarization-maintaining optical fibers from positions and height of peaks of brightness of a transmitted light which is produced by irradiating a light on the lateral side of the polarization-maintaining optical fibers during or after the connection of the polarization-maintaining optical fibers.

Furthermore, the present invention also provides a method for connecting two polarization-maintaining optical fibers without angular disagreement by using this method for estimating the amount of angular disagreement of planes of polarization between two polarization-maintaining optical fibers.

Furthermore, the present invention also provides a method for connecting two polarization-maintaining optical fibers with predetermined angular disagreement by using the method to estimate the amount of angular disagreement of planes of polarization between two polarization-maintaining optical fibers

BRIEF EXPLANATION OF THE DRAWINGS

FIG. 1A is a diagram for explaining an embodiment of the method for estimating the amount of angular disagreement of planes of polarization between two polarization-maintaining optical fibers of the present invention.

FIG. 1B is a diagram for explaining an embodiment of the method for estimating an amount of angular disagreement of planes of polarization between two polarization-maintaining optical fibers of the present invention.

DESCRIPTION OF THE PREFERRED EMBODIMENTS

Figure 2A:
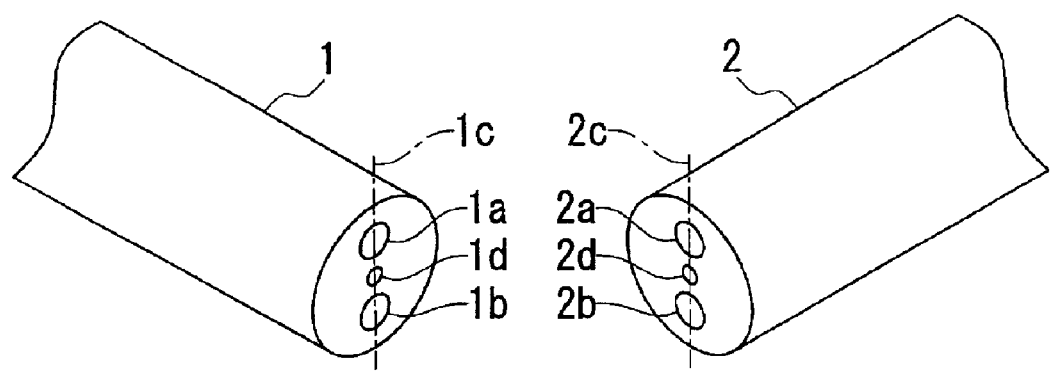
FIG. 2A is a perspective view of the optical fibers for explaining an embodiment of the method for estimating an amount of angular disagreement of planes of polarization between two polarization-maintaining optical fibers facing each other.

Preferred embodiments of the present invention will be presented in the following with reference to the figures.

FIGS. 1A and 1B are diagrams for explaining an embodiment of a method for estimating an amount of angular disagreement of planes of polarization between two polarization-maintaining optical fibers of the present invention.

In FIGS. 1A and 1B, reference numeral 1 denotes a polarization-maintaining optical fiber, reference numerals 1a and 1b denote a pair of stress applying sections of the polarization-maintaining optical fiber 1, reference numeral 1c denotes an axis of polarization which traverses axes of two stress applying sections 1a and 1b, and reference numeral 1d denotes a core of the polarization-maintaining optical fiber 1. Furthermore, reference numeral 1e denotes a first peak of brightness of a transmitted light and reference numeral 1f denotes a second peak of brightness of the transmitted light which are produced by irradiating light on a lateral side of the polarization-maintaining optical fiber 1.

FIG. 1A shows the distribution of the brightness of the transmitted light produced by irradiating the light on the lateral side of the polarization-maintaining optical fiber 1 from the direction which agrees with the axis of polarization 1c which traverses axes of two stress applying sections 1a and 1b. As a result of the existence of the stress applying sections 1a and 1b, the transmitted light produces two peaks 1e, 1f of the brightness with an axis of the polarization-maintaining optical fiber 1 between them.

When the direction of the irradiated light and the axis of polarization 1c are brought into agreement, two peaks 1e and 1f which have equal brightness are produced at symmetrical positions along the axis of the polarization-maintaining optical fiber 1, as shown in FIG. 1A. The situation in which two peaks 1e and 1f are provided at symmetrical positions along the axis of the polarization-maintaining optical fiber 1 as described above is hereinafter said to have the positions of the peaks "coincided".

In contrast, FIG. 1B shows the distribution of the brightness of the transmitted light when the direction of the irradiated light is not in agreement with the axis of polarization 1c, and the angular disagreement is caused between the planes of polarization. In this situation, two peaks 1e and 1f in which have different brightnesses occur at asymmetric positions along the axis of the polarization-maintaining optical fiber 1. Furthermore, the peaks 1e and 1f are positioned relatively apart from the axis of the polarization-maintaining optical fiber 1 compared with the case of FIG. 1A.

In addition, in the embodiment in FIGS. 1A and 1B, a PANDA (Polarization-maintaining AND Absorption reducing) fiber which have a pair of stress applying sections 1a and 1b is used. However, this invention is not limited to use of this type, and other types of polarization-maintaining optical fibers which have at least one stress applying section or which have a core having oval cross-section and with no stress applying section can also be used.

Next, the method for estimating the amount of angular disagreement of planes of polarization between two polarization-maintaining optical fibers when connecting the polarization-maintaining optical fibers as described above will be explained.

Figure 2B:
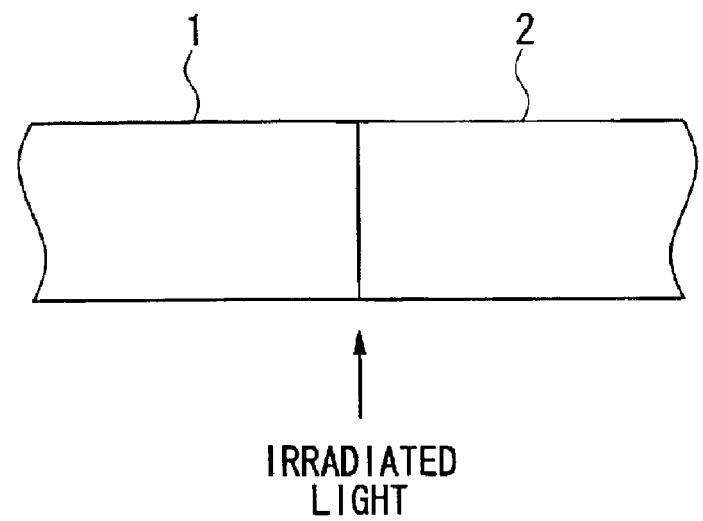
FIG. 2B is a side view of the optical fibers for explaining an embodiment of the method for estimating an amount of angular disagreement of planes of polarization between two polarization-maintaining optical fibers facing each other.

FIGS. 2A and 2B are figures for explaining the method for estimating the amount of angular disagreement of the planes of polarization between two polarization-maintaining optical fibers when facing the polarization-maintaining optical fibers to each other for connecting them.

In FIG. 2A, reference numeral 1 denotes a first polarization-maintaining optical fiber and reference numeral 2 denotes a second polarization-maintaining optical fiber. Reference numerals 1a and 1b denote a pair of stress applying sections of the first polarization-maintaining optical fiber 1, reference numerals 2a and 2b denote a pair of stress applying sections of the second polarization-maintaining optical fiber 2, reference numeral 1c denotes an axis of polarization which traverses axes of the stress applying sections 1a and 1b, and reference numeral 2c denotes an axis of polarization which traverses axes of the stress applying sections 2a and 2b. Furthermore, reference numeral 1d denotes a core of the first polarization-maintaining optical fiber 1 and reference numeral 2d denote a core of the second polarization-maintaining optical fiber 2.

FIG. 2B shows a situation of light irradiation on a connecting position of these polarization-maintaining optical fibers 1 and 2 for explaining an embodiment of the method for estimating an amount of angular disagreement of planes of polarization between two polarization-maintaining optical fibers 1 and 2 when connecting them.

In the following explanations, it is considered that the first polarization-maintaining optical fiber 1 is positioned at the left side and the second polarization-maintaining optical fiber 2 is positioned at the right side.

When the height of the first peak of brightness of the light which has transmitted the first polarization-maintaining optical fiber 1 is denoted by the symbol hL1, the height of the second peak of brightness of the light which has transmitted the first polarization-maintaining optical fiber 1 is denoted by the symbol hL2, the position of the first peak toward the center of the first polarization-maintaining optical fiber 1 is denoted by the symbol pL1, and the position of the second peak toward the center of the first polarization-maintaining optical fiber 1 is denoted by the symbol pL2, the amount of angular disagreement of the plane of polarization of the first polarization-maintaining optical fiber 1 can be denoted as a function F of hL1, hL2, pL1, and pL2. That is, the amount of angular disagreement of the plane of polarization of the first polarization-maintaining optical fiber 1 can be denoted as F (hL1, hL2, pL1, pL2). This function F is determined to comply with the type of the polarization-maintaining optical fiber, optical characteristics of the lenses which are used for the measurement, and a wavelength of a light source of the irradiated light.

Similarly, when the height of the first peak of brightness of the light which has transmitted the second polarization-maintaining optical fiber 2 is denoted by the symbol hR1, the height of the second peak of brightness of the light which has transmitted the second polarization-maintaining optical fiber 2 is denoted by the symbol hR2, the position of the first peak toward the center of the second polarization-maintaining optical fiber 2 is denoted by the symbol pR1, and the position of the second peak toward the center of the second polarization-maintaining optical fiber 2 is denoted by the symbol pR2, the amount of angular disagreement of the plane of polarization of the second polarization-maintaining optical fiber 2 can be denoted as a function F of hR1, hR2, pR1, and pR2. That is, the amount of angular disagreement of the plane of polarization of the second polarization-maintaining optical fiber 2 can be denoted as F (hR1, hR2, pR1, pR2).

Therefore, the amount of angular disagreement of the planes of polarization between first and second polarization-maintaining optical fibers 1 and 2 when connecting these polarization-maintaining optical fibers 1 and 2 can be denoted as F(hL1, hL2, pL1, pL2)–F(hR 1, hR2, pR1, pR2), using the above-described amount of angular disagreement of the plane of polarization of respective polarization-maintaining optical fibers 1 and 2.

Furthermore, when the amount of angular disagreement of the planes of polarization is measured, cross-talk during the connection of the polarization-maintaining optical fibers 1 and 2 can be calculated, since the cross-talk (db) is denoted as $-10 \log$ (amount of angular disagreement of the planes of polarization$^2$).

Figure 3:
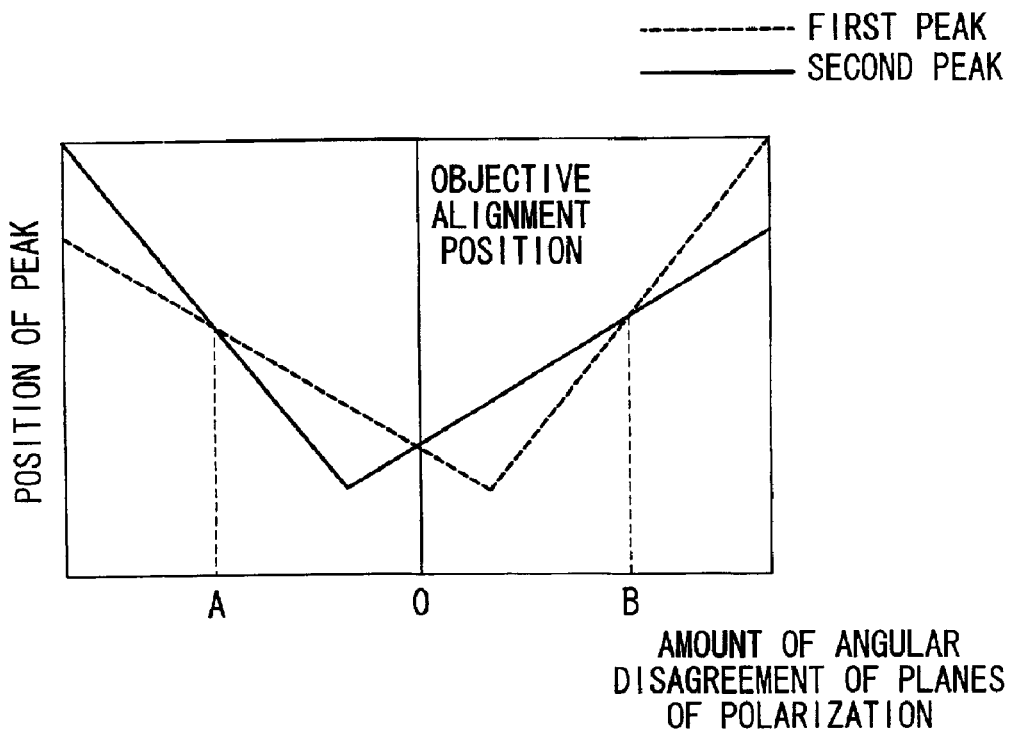
FIG. 3 is a diagram for explaining the relationships in an embodiment between positions of peaks of brightness of a transmitted light and an amount of angular disagreement of planes of polarization between two polarization-maintaining optical fibers.

FIG. 3 is a diagram for explaining the relationships in an embodiment between the positions of the peaks of brightness of the transmitted light and the amount of angular disagreement of planes of polarization between the polarization-maintaining optical fibers.

Figure 4:
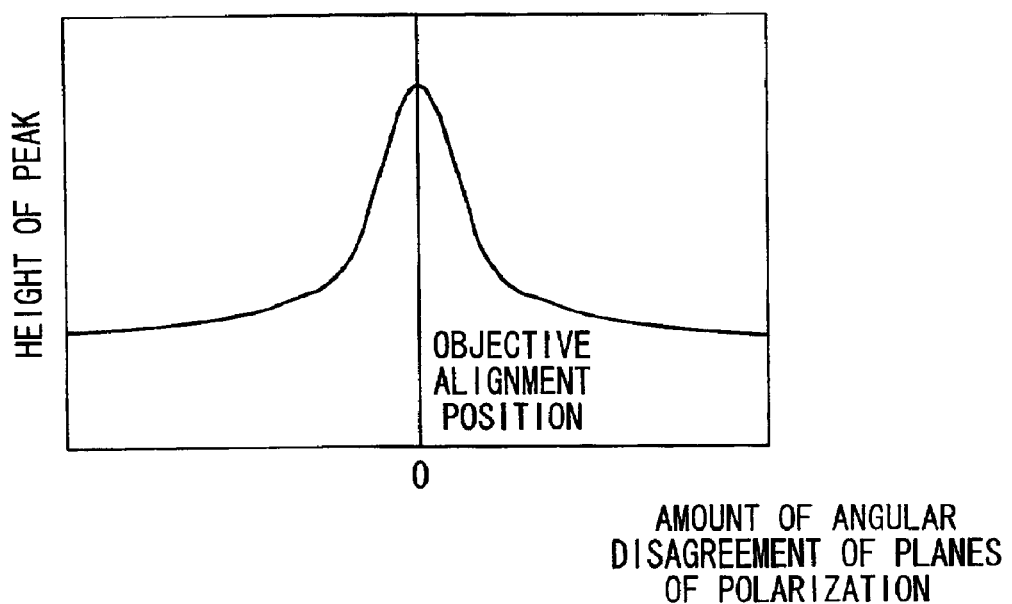
FIG. 4 is a diagram for explaining the relationships in an embodiment between height of peaks of brightness of a transmitted light and an amount of angular disagreement of planes of polarization between two polarization-maintaining optical fibers.

FIG. 4 is a diagram for explaining the relationships in an embodiment between the height of the peaks of brightness of the transmitted light and the amount of angular disagreement of planes of polarization between the polarization-maintaining optical fibers. The relationship between the positions or height of the peaks and the amount of angular disagreement of the planes of polarization is varied in accordance with the characteristics of the polarization-maintaining optical fibers, especially with the shape, material, and refractive index of the stress applying sections.

As can be seen from FIG. 3, the positions of two peaks are coincided at the point at which the angular disagreement of the planes of polarization is zero and which corresponds to an objective alignment position of the polarization-maintaining optical fibers. However, the positions of two peaks are also coincided at the points which are denoted by symbols A and B, although the angular disagreement of the planes of polarization occurs at these points. Hence, the amount of angular disagreement of the planes of polarization cannot be estimated from the information that merely informs that the positions of two peaks are coincided, and the objective alignment position of the polarization-maintaining optical fibers cannot be determined.

However, as can be seen from FIG. 4, the heights of the peaks are distributed so as to be highest at the point at which the angular disagreement of the planes of polarization is zero and which corresponds to the objective alignment position of the polarization-maintaining optical fibers. Therefore, by using the information that indicates the height of two peaks, the objective alignment position of the polarization-maintaining optical fibers can be distinguished from the points A and B in which the angular disagreements occur. Consequently, the amount of angular disagreement of the planes of polarization can be estimated from the information concerning the positions and height of the peaks, and the objective alignment position of the polarization-maintaining optical fibers can be determined.

Furthermore, as can be seen from FIG. 3, when the positions of two peaks do not coincide, the amount of angular disagreement of the planes of polarization cannot be estimated. However, by further using the information concerning the height of peaks which is shown in FIG. 4, the amount of angular disagreement of the planes of polarization enables estimation.

In addition, the above-described method for estimating the amount of angular disagreement of the planes of polarization can not only be utilized when connecting the polarization-maintaining optical fibers but can also be utilized for calculating the rotation angle of the planes of polarization after connecting the polarization-maintaining optical fiber.

As described above, in this method for estimating the amount of angular disagreement of the planes of polarization, the amount of angular disagreement of the planes of polarization can be accurately estimated from the positions and height of the peaks of brightness of the transmitted light which occurs by irradiating the light on the lateral side of a connecting portion of the polarization-maintaining optical fibers.

Furthermore, in the present invention, since the amount of angular disagreement of the planes of polarization can be accurately estimated, the polarization-maintaining optical fibers can be accurately connected without angular disagreement of the planes of polarization by rotating the polarization-maintaining optical fibers to comply with the amount of angular disagreement of the planes of polarization even when the polarization-maintaining optical fibers have angular disagreement between their planes of polarization.

Furthermore, in the present invention, since the amount of angular disagreement of the planes of polarization can be accurately estimated, the polarization-maintaining optical fibers can be accurately connected with desired or predetermined angular disagreement of the planes of polarization by rotating the polarization-maintaining optical fibers to comply with the amount of angular disagreement of the planes of polarization even when the polarization-maintaining optical fibers have angular disagreement between their planes of polarization.

What is claimed is:

1. A method for estimating an amount of angular disagreement of planes of polarization between two polarization-maintaining optical fibers in which at least one of the polarization-maintaining optical fibers has a pair of stress applying sections, and comprising steps of:

irradiating a light on the lateral side of said polarization-maintaining optical fibers during a connection of said polarization-maintaining optical fibers, and estimating the amount of angular disagreement of the plane of polarization of the polarization-maintaining optical fiber having said stress applying sections from a function which uses positions and heights of two peaks of brightness as variable quantities corresponding to the stress applying sections of a transmitted light produced by irradiating said light.

2. A method for connecting two polarization-maintaining optical fibers without angular disagreement, comprising steps of estimating an amount of angular disagreement of planes of polarization between two polarization-maintaining optical fibers by using the method for estimating the amount of angular disagreement of planes of polarization between two polarization-maintaining optical fibers according to claim 1, and of connecting two polarization-maintaining optical fibers to comply with an estimated amount of angular disagreement of the planes of polarization of the optical fibers.

3. A method for connecting two polarization-maintaining optical fibers with predetermined angular disagreement, comprising steps of estimating an amount of angular disagreement of planes of polarization between two polarization-maintaining optical fibers by using the method for estimating the amount of angular disagreement of planes of polarization between two polarization-maintaining optical fibers according to claim 1, and of connecting two polarization-maintaining optical fibers to comply with an estimated amount of angular disagreement of the planes of polarization of the optical fibers.

4. A method for estimating an amount of angular disagreement of planes of polarization between two polarization-maintaining optical fibers in which at least one of the polarization-maintaining optical fibers has a pair of stress applying sections, and comprising steps of:

irradiating a light on the lateral side of said polarization-maintaining optical fibers after a connection of said polarization-maintaining optical fibers, and estimating the amount of angular disagreement of the plane of polarization of the polarization-maintaining optical fiber having said stress applying sections from a function which uses positions and heights of two peaks of brightness as variable quantities corresponding to the stress applying sections of a transmitted light produced by irradiating said light.

* * * * *